Patented Sept. 14, 1954

2,689,168

UNITED STATES PATENT OFFICE 2,689,168

PRODUCTION OF GAMMA FERRIC OXIDE

Douglas Marshall Dovey, Hampstead, and Wilfred Robarts Pitkin, Belvedere, England, assignors to The General Electric Company Limited, London, England No Drawing. Application November 22, 1949, Serial No. 128,923

Claims priority, application Great Britain November 24, 1948

6 Claims. (Cl. 23—200)

This invention relates to the production of ferric oxide, and more particularly to a process for the production of γ-ferric oxide in the form of a finely-divided crystalline powder.

As is well known, ferric oxide, $Fe_2O_3$, exists in two forms, namely the α form and the γ form, which differ in their crystal structure and in magnetic properties. γ-ferric oxide is characterised by being ferromagnetic and by possessing magnetic properties that made it suitable, in powdered form, for certain applications such as the formation of the magnetisable coating on recording tape. For this purpose in particular it is desirable that the magnetic powder used should be formed of crystals of substantially uniform size and of small diameter, for example approximately one micron or less, and it is further desirable that the separate particles, which may be single crystals or aggregates of crystals, of which the powder consists should be of substantially uniform size and of small diameter, preferably of the order of one micron or less.

In copending application Serial No. 108,226, filed August 2, 1949, and assigned to the assignee of the instant application, there is described a method of producing γ-ferric oxide which conforms to the above-mentioned requirements of crystal size, which method comprises heating iron oxalate or iron formate, of suitable crystal size, to produce ferrosoferric oxide, and converting the latter to γ-ferric oxide by controlled oxidation.

We have now found that γ-ferric oxide powder of the required crystal size can be obtained by reducing α-ferric oxide of suitably small crystal size to ferrosoferric oxide and oxidising the latter under controlled conditions.

According to the present invention, therefore, a process for the production of γ-ferric oxide in the form of a finely-divided crystalline powder comprises heating α-ferric oxide which is in the form of small crystals, preferably of diameter of approximately one micron or less, to a temperature between 275° C. and 400° C. in a reducing atmosphere until the weight of the product is not more than 97% of the weight of the anhydrous α-ferric oxide, and then oxidising the product by heating it in air at a temperature between 100° C. and 350° C., the rate of oxidation being controlled so as to prevent the temperature of the oxide from rising to such an extent that an appreciable proportion of α-ferric oxide is produced.

The α-ferric oxide employed should be of high purity and must be in a finely-divided state, preferably consisting of particles, whether single crystals or crystal aggregates, of diameter of the order of one micron or less. Some commercially obtainable α-ferric oxide powders, usually those of a bright red colour, are suitable. Alternatively the α-ferric oxide may be prepared, in situ or otherwise, by heating powdered hydrated ferric oxide at a temperature sufficiently low to give a suitable finely-divided product. We have found that α-ferric oxide powders of relatively large particle size, such as the darker red oxide powders obtainable commercially, are unsuitable for the production of γ-ferric oxide, since the ferrosoferric oxide obtained by the reduction of such powders is apparently not of a sufficiently "active" character to enable the subsequent oxidation to be effected at the relatively low temperatures required to produce γ-ferric oxide.

Moreover the α-ferric oxide used as the starting material preferably consists of crystals of substantially uniform size. This ensures that the crystals of the γ-ferric oxide produced will be of substantially uniform size, since both the ferrosoferric oxide obtained as the intermediate product and the γ-ferric oxide obtained as the final product are in the form of crystals which are pseudomorphs of the original α-ferric oxide crystals. Hence the sizes of the crystals of the γ-ferric oxide produced are determined by those of the α-ferric oxide used.

In carrying out the first stage of the process according to the invention, the α-ferric oxide powder is heated in a reducing atmosphere, preferably comprising hydrogen or carbon monoxide or both these gases, to a temperature between 275° C. and 400° C., the most suitable temperatures being between 300° C. and 350° C. The heating is continued until the weight of the product is not more than 97% of the weight of the anhydrous α-ferric oxide used, indicating that substantially complete reduction to ferrosoferric oxide, $Fe_3O_4$, has taken place.

The product of the reduction step is allowed to cool to below 100° C. in the reducing atmosphere or in an inert atmosphere such as carbon dioxide. If the reduction has been carried out at too high a temperature the product is liable to ignite spontaneously on exposure to air. The risk of such an occurrence may be eliminated either by damping the product with water before it is exposed to air or by admitting air slowly into the treatment chamber. However, if the temperature during the reduction is kept considerably below 400° C., preferably below 350° C., such precautions should not be necessary.

The ferrosoferric oxide obtained by the reduction step is converted into γ-ferric oxide by oxidation at a controlled rate in air at a temperature not exceeding 350° C., the rate of oxidation preferably being controlled so that the oxide is maintained at a temperature between 150° C. and 200° C. The maintenance of the oxide at a relatively low temperature during the oxidation step is necessary to ensure that the ferric oxide produced is predominantly in the γ, and not in the α, form. The oxidation may be effected either by damping the ferrosoferric oxide with water and drying it in an air oven maintained at the appropriate temperature, or by heating the dry oxide in a restricted supply of air, preferably at a temperature between 150° C. and 200° C.

One method of producing γ-ferric oxide according to the invention will now be described by way of example.

In this method, a quantity of α-ferric oxide, bright red in colour and consisting of crystalline particles of substantially uniform size and of diameter approximately one micron, is heated in an electric furnace maintained at a temperature of 325° C. while a slow stream of hydrogen is passed through the furnace. This treatment is continued until the reduction of the α-ferric oxide to ferrosoferric oxide is substantially complete, as indicated by the colour change from red to black and by a reduction in the weight of the material to 97%, or less, of its original weight. The length of time required for the reduction depends upon the amount of material being treated, and the manner in which it is disposed in the treatment vessel, as well as upon the temperature: for example, a layer of material approximately half an inch thick will require to be treated, at 325° C., for about an hour.

The product of the reduction is allowed to cool in the hydrogen atmosphere, and is then removed from the furnace, thoroughly damped with water, and placed in an oven maintained at 160° C. for three hours. The final product is allowed to cool, and is then crushed to break up any cakes or loose aggregates of crystals. The product consists of substantially pure γ-ferric oxide in the form of crystals of approximately one micron in diameter and of a high degree of uniformity in size.

We claim:

1. A process for the production of gamma ferric oxide in the form of a finely-divided crystalline powder, which comprises the steps of heating commercial alpha ferric oxide which is in the form of small crystals, of diameter not greater than one micron, to a temperature between 275° C. and 400° C. in a reducing atmosphere until substantially complete conversion to ferrosoferric oxide has taken place, cooling to below 100° C. the ferrosoferric oxide thus formed, thoroughly dampening the cooled ferrosoferric oxide with water, oxidizing the dampened ferrosoferric oxide by heating it in air at a temperature between 100° C. and 350° C. to obtain substantially pure gamma ferric oxide, the rate of oxidation being controlled by dampening so as to prevent an exothermic rise of the temperature of the ferrosoferric oxide above 350° C., and recovering the gamma ferric oxide.

2. A process according to claim 1 wherein the said reducing atmosphere consists of at least one of the gases hydrogen and carbon monoxide.

3. A process according to claim 1 wherein the α-ferric oxide is heated at a temperature between 300° C. and 350° C. during the reduction step.

4. A process according to claim 1 wherein the oxidation step is carried out at a temperature between 150° C. and 200° C.

5. A process for the production of γ-ferric oxide in the form of a powder consisting of crystals of approximately one micron in diameter and of a high degree of uniformity in size, which comprises the steps of heating commercial α-ferric oxide, in the form of crystalline particles of substantially uniform size and of diameter approximately one micron, in a furnace maintained at a temperature of 325° C. while a slow stream of hydrogen is passed through the furnace, until substantially complete conversion to ferrosoferric oxide has taken place, cooling the product in hydrogen to below 100° C., dampening the cooled product with water, drying the dampened material in air in an oven maintained at 160° C. for three hours to convert the ferrosoferric oxide to substantially pure gamma ferric oxide, crushing the dried product, and recovering the gamma ferric oxide.

6. A process for the production of gamma ferric oxide in the form of a finely-divided crystalline powder, which comprises the steps of heating commercial alpha ferric oxide crystal aggregates, of diameter not greater than one micron, to a temperature between 275° C. and 400° C. in a reducing atmosphere until substantially complete conversion to ferrosoferric oxide has taken place, cooling to below 100° C. the ferrosoferric oxide thus formed, thoroughly dampening the cooled ferrosoferric oxide with water, oxidizing the dampened ferrosoferric oxide by heating it in air at a temperature between 100° C. and 350° C. to convert the ferrosoferric oxide to substantially pure gamma ferric oxide, the rate of oxidation being controlled so as to prevent an exothermic rise of the temperature of the ferrosoferric oxide above 350° C., and recovering the gamma ferric oxide.

References Cited in the file of this patent

UNITED STATES PATENTS

| Number | Name | Date |
|---|---|---|
| 2,217,569 | Stephan | Oct. 8, 1940 |
| 2,418,467 | Ellis | Apr. 8, 1947 |
| 2,497,268 | Neel | Feb. 14, 1950 |

FOREIGN PATENTS

| Number | Country | Date |
|---|---|---|
| 466,023 | Great Britain | May 18, 1937 |

OTHER REFERENCES

Klimm: "Z. Electrochem.," vol. 46, pages 296, 297 (1940), cited from Chem. Abstracts, vol. 34, col. 4951.

Mellor: "Comprehensive Treatise on Inorganic and Theoretical Chemistry," pages 732, 738, 780, vol. 13 (1934), publ. by Longmans, Green and Co., N. Y. C.

Welo and Baudisch: "Two Stage Transformation of Magnetite into Hematite," Phil. Mag., vol. 50, pages 399–408 (1925).

Gottschalk: "Coercive Force of Magnetic Powder," U. S. Bureau of Mines Bull. 425, Magnetic Separation of Ores, pages 88–95, publ. 1941 by U. S. G. P. O., Washington, D. C.

Scofield: "Paint Manufacture," vol. 17, No. 6, pages 181–184, June 1947.